US012794928B2

(12) United States Patent
Szurdi et al.

(10) Patent No.: US 12,794,928 B2
(45) Date of Patent: Nov. 10, 2026

(54) PROACTIVELY DEFENDING AGAINST DNS COMPROMISE, MISUSE, AND ERRORS USING HISTORICAL RESOURCE RECORDS

(71) Applicant: Palo Alto Networks, Inc., Santa Clara, CA (US)

(72) Inventors: Janos Szurdi, Budapest (HU); Daiping Liu, Sunnyvale, CA (US); Zhanhao Chen, Santa Clara, CA (US); Ruian Duan, Fremont City, CA (US); Mohammad Ghasemisharif, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 166 days.

(21) Appl. No.: 18/821,536

(22) Filed: Aug. 30, 2024

(65) Prior Publication Data

US 2026/0067317 A1 Mar. 5, 2026

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC ........................ H04L 63/1433; H04L 63/1425
See application file for complete search history.

(56) References Cited

U.S. PATENT DOCUMENTS

2023/0156044 A1 * 5/2023 St. Pierre ............ H04L 61/4511 726/3
2024/0015132 A1 * 1/2024 Yuan ....................... H04L 61/59

OTHER PUBLICATIONS

Houser, et al., "A Comprehensive Measurement-based Investigation of DNS Hijacking", In Proceedings of the 40th International Symposium on Reliable Distributed Systems (SRDS), Sep. 20-23, 2021, 12 pages, DOI: 10.1109/SRDS53918.2021.00029.

Lawrence, et al., "RFC 8767: Serving Stale Data to Improve DNS Resiliency", [online], [retrieved on Aug. 27, 2024] Retrieved from the Internet: <https://datatracker.ietf.org/doc/html/rfc8767>, Mar. 2020, 12 pages.

Szurdi, et al., "The Long "Taile" of Typosquatting Domain Names", In Proceedings of 23rd USENIX Security Symposium (USENIX Security 14), Aug. 20-22, 2014, 17 pages, <https://www.usenix.org/conference/usenixsecurity14/technical-sessions/presentation/szurdi>.

* cited by examiner

*Primary Examiner* — Baotran N To
(74) *Attorney, Agent, or Firm* — Gilliam IP PLLC

(57) ABSTRACT

A DNS security service evaluates detected DNS requests to determine if the DNS requests should be forwarded to their destination. For DNS requests permitted to be forwarded to their destination, the service determines from the corresponding DNS response if the resource record (RR) included therein is known benign. If the RR is not known benign, the service determines a best RR that is known benign by performing one or more lookups in a resource record history. If a known benign RR is identified as a result of the lookup(s), the service incorporates data from the known RR into a new RR included in a DNS response that is forwarded to the client. For DNS requests that are not permitted to be forwarded to their destination, the service determines data of a known benign RR to return to the client in a constructed DNS response without forwarding the DNS request to its destination to obtain a DNS response.

20 Claims, 6 Drawing Sheets

PROACTIVELY DEFENDING AGAINST DNS COMPROMISE, MISUSE, AND ERRORS USING HISTORICAL RESOURCE RECORDS

BACKGROUND

The disclosure generally relates to data processing (e.g., CPC subclass G06F) and to security arrangements for protecting computers, components thereof, programs, or data from unauthorized activity (e.g., CPC subclass G06F 21/00).

The Domain Name System (DNS) is a hierarchical naming system that maps domain names that serve as human-readable addresses to Internet Protocol (IP) addresses of websites and Internet-accessible resources. A fully qualified domain name (FQDN), which is a complete domain name associated with a resource, includes multiple components. These components include a root domain, a top-level domain (TLD) (e.g., .com or .org), and optional subdomains, or prefixes of a domain name.

DNS resource records, commonly abbreviated as RRs, store information about domain names and IP addresses and are used to resolve DNS queries. Resource records are the units of information in DNS zone files. Resource records include fields indicating an owner (i.e., FQDN) associated with the record, record type ("rrtype"), class, time to live (TTL), and resource data ("rdata" or "rrdata"). The rrdata of a resource record is of a variable type that is dependent on the record type. To illustrate, address records, denoted with a type field value of "A", store an IP address as rrdata.

As the number of registered domain names continues to grow, the management and security of DNS communications has become increasingly important, as domain names and DNS requests/responses can be exploited for malicious purposes. For instance, domain names that mimic legitimate websites (a practice known as "typosquatting" or "domain squatting") are often registered to deceive users into providing sensitive information, such as usernames, passwords, and credit card details, and malicious domain names can be used to spread malware, conduct phishing attacks, or participate in botnet operations. As another example, DNS tunneling is an abuse of the DNS protocol in which attackers embed malicious code in DNS requests and responses, such as to carry out data exfiltration or infiltration.

BRIEF DESCRIPTION OF THE DRAWINGS

Embodiments of the disclosure may be better understood by referencing the accompanying drawings.

DESCRIPTION

Figure 1:
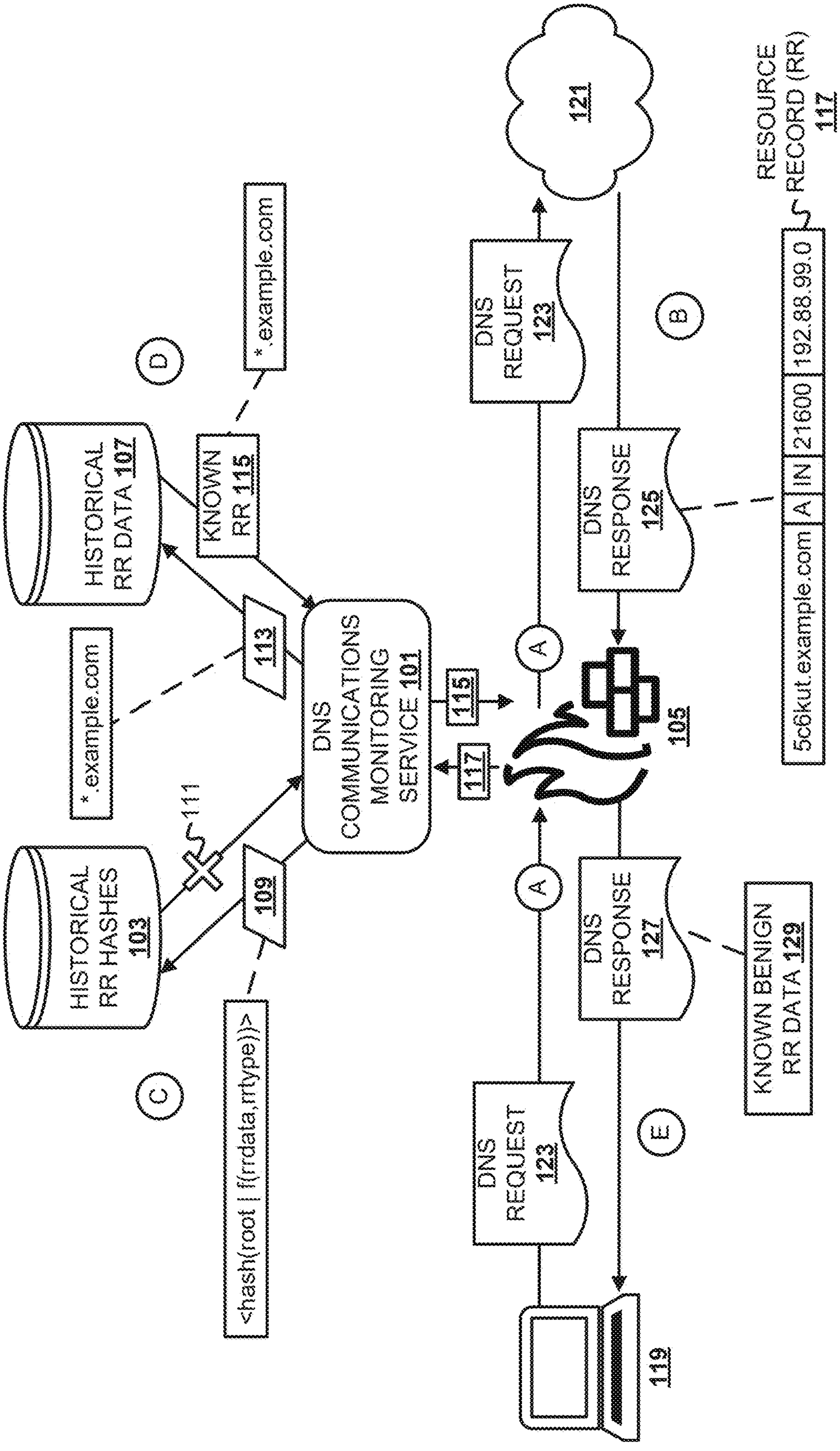
FIG. 1 is a conceptual diagram of proactive monitoring of DNS communications that utilizes historical data of known benign resource records.

The description that follows includes example systems, methods, techniques, and program flows to aid in understanding the disclosure and not to limit claim scope. Well-known instruction instances, protocols, structures, and techniques have not been shown in detail for conciseness.

Overview

DNS communications are prone to a variety of attacks and security issues, such as DNS hijacking, DNS misconfiguration, bit flip errors, and DNS tunneling-based attacks. However, detection services for DNS security may be prone to false positive detections of malicious or suspicious DNS requests/responses and/or resource records returned in DNS responses. A proactive DNS security service disclosed herein mitigates the potential for false positive detections while also preventing attacks carried out through these means. The service evaluates detected DNS requests from clients to determine if the DNS requests should be forwarded to their destination to obtain a DNS response. The evaluation includes determining if a DNS request is malicious, such as if the DNS request is indicative of DNS tunneling for data exfiltration. For DNS requests that are permitted to be forwarded to their destination, the service determines from the respective DNS response if the resource record included therein is known to be benign based on querying a data store that maintains hash values computed from known benign resource records. The data store stores hash values computed based on resource records to allow for rapid lookups for resource records identified in DNS responses. If the query yields a result, the service determines that the resource record is known benign, and the DNS response is forwarded to the requesting client. If the query does not yield a result, the resource record is deemed unknown.

When the resource record is deemed unknown, to reduce service disruptions while allowing for offline evaluation of the unknown resource record, the service determines if there is resource record data (the resource record data, or rrdata field) included in a known benign resource record that should be returned in a DNS response instead of blocking the DNS response with the unknown resource record outright. The service performs a series of lookups in a resource record history based on the domain name indicated in the resource record or a representation thereof (e.g., a wildcard domain) to determine if there is a match among the known benign resource records. If a resource record is returned as a result of a successful lookup, the service incorporates the resource record data of the known resource record in a DNS response that is forwarded to the client. For DNS requests that are not forwarded to their destination, such as those indicative of DNS tunneling for data exfiltration, the service determines a known resource record to return to the client without first obtaining a DNS response. This blocks the detected data exfiltration attempt via DNS tunneling without disrupting service for the client.

Example Illustrations

FIG. 1 is a conceptual diagram of proactive monitoring of DNS communications that utilizes historical data of known benign resource records. A DNS communications monitoring service ("service") 101 executes as part of a firewall 105 (e.g., as a firewall service). For instance, the service 101 can be implemented as a firewall service or a cloud-based service with which the firewall 105 communicates over a secure connection. The firewall 105 monitors network traffic of a network (not depicted in FIG. 1), which includes network traffic sent to and from a client 119. The firewall 105 can be a virtual or physical firewall.

FIG. 1 is annotated with a series of letters A-E. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the firewall 105 detects a DNS request 123 sent by the client 119. The firewall 105 forwards the DNS request 123 to its DNS server destination over a network 121 (e.g., the Internet). This example assumes that the DNS request 123 is not found to be malicious by the service 101 (e.g., if maliciousness of the DNS request 123 is not detected) and thus is allowed by a security policy of the firewall 105.

At stage B, the firewall 105 detects a DNS response 125 sent in response to the DNS request 123. The DNS response 125 includes a resource record 117. This example depicts the resource record 117 as being an address record that maps a domain name "5c6kut.example.com" to an IP address 192.88.99.0 included as resource record data ("rrdata.") The firewall 105 provides the resource record 117 to the service 101. For instance, the firewall 105 can forward the DNS response 125 that comprises the resource record 117 to the service 101 or can extract (e.g., copy) the resource record 117 from the DNS response 125 and provide the resource record 117 to the service 101.

At stage C, the service 101 determines if the resource record 117 is known benign. The service 101 has access to a database of historical resource record hashes ("hash database") 103, which may be maintained by or externally to the service 101. The hash database 103 have been previously computed based on resource records known to be benign. A hash of a resource record may be computed by applying a function to information extracted from a resource record (e.g., the rrdata and resource record type "rrtype") and computing a hash based at least partly on the result of applying the function, such as by concatenating the root domain of the domain name to the result of applying the function and hashing the concatenated value as indicated by <hash(root|f(rrdata, rrtype))> in FIG. 1. The function that is applied to information extracted from a resource record may be dependent on the type of the resource record. Applying functions to information extracted from resource records and hashing the resulting value or another intermediate value determined based on the resulting value (e.g., the resulting value concatenated with the root domain) saves space due to each resource record being represented with a smaller value and/or due to the potential for multiple resource records to have a same hash value and thus allows more resource records to be represented in the hash database 103. The service 101 can hash the resulting value according to a standard hash function, such as by computing an MD5 hash or a SHA-256 hash, or a proprietary hash function.

Since the resource record 117 is an address type record, the service 101 applies a function to the rrdata of the resource record 117 (i.e., the IP address 192.88.99.0), such as a function that returns the /24 subnet (i.e., 192.88.99.0/24) associated with the IP address indicated in the rrdata of the resource record 117. The service 101 computes a hash value 109 by hashing the value comprising the root domain of the domain name indicated in the resource record 117 (i.e., the root domain "example.com") concatenated to the result of applying the function to the rrdata of the resource record 117 (i.e., the subnet 192.88.99.0/24). The service 101 queries the hash database 103 with the hash value 109 and obtains a result 111 indicating that the hash value 109 was not identified in the hash database 103. The resource record 117 is thus determined to be unknown.

At stage D, the service 101 determines a best known benign resource record to return based on the resource record 117. The best known benign resource record can be considered the resource record known to be benign that indicates a domain name that is closest to the domain name indicated in the resource record 117. The service 101 has access to a database of historical resource record data 107, which may be maintained by the service 101 or externally to the service 101. The historical resource record data 107 comprises data extracted from or associated with resource records known to be benign, such as domain names, root domains, rrdata, and resource record types. The historical resource record data 107 can also comprise indications of when each resource record was last seen in the network secured by the firewall 105 or in an external network. The historical resource record data 107 can also indicate a country code(s) corresponding to geographical location associated with each resource record.

The service 101 can perform a series of lookups in the historical resource record data 107 with information of varying degrees of granularity identified from the resource record 117, with the resource record that is returned as a result of a successful lookup (if any) used as the best known benign resource record. To illustrate, the service 101 can perform a first lookup with the FQDN indicated in the resource record 117 (5c6kut.example.com in this example). If a resource record is returned as a result of the lookup being successful, the service 101 selects that resource record as the best known benign resource record. If the lookup fails, the service can determine a wildcard domain that matches subdomains of a parent domain of the FQDN indicated in the resource record 117 (e.g., "*.example.com") and query the historical resource record data 107 with this wildcard domain. If this lookup fails, the service can perform a last lookup in historical resource record data 107 for resource records indicating domain names that end with the root domain of the FQDN indicated in the resource record 117 (i.e., with the domain name "example.com*"). If multiple resource records are identified as a result of a lookup in the historical resource record data 107, the service 101 may select the most recent resource record to use as the best resource record (e.g., based on timestamps associated therewith). For simplicity, this example depicts the service 101 as performing a lookup 113 with "*.example.com". The service 101 obtains a known resource record 115 as a result of the lookup 113 that corresponds to the wildcard record "*.example.com". The service 101 provides the known resource record 115 to the firewall 105.

At stage E, the firewall 105 sends a DNS response 127 that comprises data of the known resource record 115, depicted as known benign resource record data 129, to the client 119. The firewall 105 can overwrite the resource record 117 indicated in the DNS response 125 with the data identified from the known resource record 115 and send the resulting DNS response 127 to the client 119. Data of the known resource record 115 that the service incorporates in the DNS response 125 to generate the DNS response 127 can include the rrdata of the known resource record 115, for instance.

The service 101 or another entity that builds and maintains the hash database 103 and historical resource record data 107 of FIG. 1 can update the hash database 103 and historical resource record data 107 periodically (e.g., daily) to add new resource records and/or remove stale resource records. The service 101 or other entity can obtain resource records from passive DNS (pDNS) data (e.g., by querying pDNS data collected for the network that the firewall 105 secures) and transform the records to generate the respective hashes stored in the hash database 103 and representations stored in the historical resource record data 107. Resource records that are known to correspond to malicious entities are removed before they are stored in their corresponding representations in the hash database 103 and historical resource record data 107. The hash stored in the hash database 103 is generated for each resource record by hashing a value determined based at least partly on the rrdata of the resource record (e.g., an intermediate value determined based on the rrdata that is concatenated with the root domain). The hash database 103 and historical resource record data 107 are periodically (e.g., daily) updated/refreshed to include entries generated from the most recent resource records and to remove stale entries (e.g., those with an age that exceeds a threshold).

Figure 2:
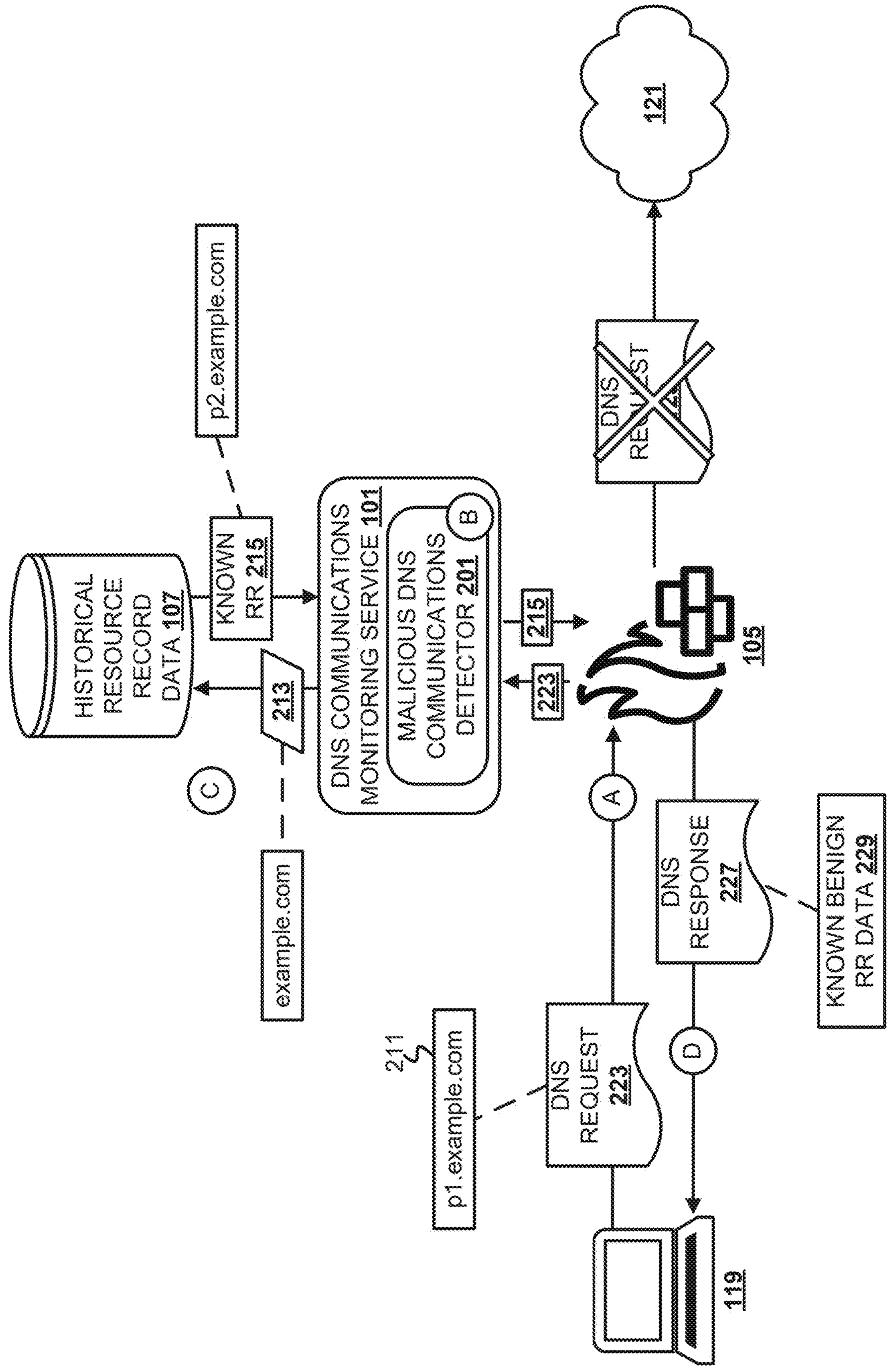
FIG. 2 is a conceptual diagram of another example of proactive monitoring of DNS communications that utilizes historical data of known benign resource records.

FIG. 2 is a conceptual diagram of another example of proactive monitoring of DNS communications that utilizes historical data of known benign resource records. While FIG. 1 depicted an example where a DNS request was permitted to be forwarded to its destination, in other examples such as the example in FIG. 2, DNS requests can be determined to be suspicious or malicious based on evaluation by the firewall 105.

FIG. 2 is annotated with a series of letters A-D. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the firewall 105 detects a DNS request 223 sent by the client 119. The DNS request 223 indicates a domain name 211, depicted as "p1.example.com" in this example. In contrast with FIG. 1, this example does not assume that the DNS request 223 is allowed by the security policy of the firewall 105.

At stage B, a malicious DNS communications detector ("the detector") 201 analyzes the DNS request 223 for one or more indicators of maliciousness. The detector 201 analyze the DNS request 223, for example, for indications of DNS tunneling exfiltration (i.e., data exfiltration carried out via DNS tunneling). While FIG. 2 depicts the detector 201 as analyzing the DNS request 223, multiple detectors can analyze the DNS request 223 for other indicators of maliciousness. This example assumes that the detector 201 determines that the DNS request 223 is malicious due to being indicative of DNS tunneling exfiltration, so the DNS request 223 is not forwarded to its destination in the network 121 (i.e., is blocked by the firewall 105). For instance, the detector 201 may detect DNS tunneling in the DNS request 223, which could be used for data exfiltration and thus result in the DNS request being classified as malicious. For other types of malicious detections (not depicted in FIG. 2), such as detected command-and-control activity, the DNS request 223 is blocked by the firewall 105, and a DNS response is not returned to the client 119. This example assumes that no such maliciousness detection that blocks the DNS request 223 is made for the DNS request 223, however.

At stage C, the service 101 determines a best known benign resource record based on the DNS request 223. The service 101 performs a lookup 213 in the historical resource record data 107 with information determined from the DNS request 223, which at least includes the domain name 211 and the resource record type ("rrtype"). The service 101 queries the historical resource record data 107 without first searching the hash database 103 as described in reference FIG. 1 because the detector 201 already determined that the DNS request 223 is malicious and thus is not known to be benign. Querying the historical resource record data 107 is performed as similarly described in reference to FIG. 1, and repeated description of performing the lookups in the historical resource record data 107 is omitted from this example for brevity. This example assumes that after performing a lookup in the historical resource record data 107 with the root of the domain name 211 identified in the DNS request 223, or "example.com", the service 101 obtains a known resource record 215 comprising a domain name that matches the root of the domain name 211, depicted as the example domain name "p2.example.com" in FIG. 2. Identifying a known benign resource record to return in these cases reduces service disruptions for end users while still blocking malicious DNS requests from being fulfilled from their indicated destination.

At stage D, the firewall 105 sends a DNS response 227 that comprises data of the known resource record 215, depicted as known benign resource record data 229, to the client 119. The firewall 105 can construct a DNS response that includes data identified from the resource record 215 to generate the DNS response 227 and forwards the DNS response 227 to the client 119. In this example, the client 119 obtains a resource known to be benign but without risking data exfiltration or another security risk resulting from allowing the malicious DNS request 223 to leave the network secured by the firewall 105.

FIG. 2 refers to preventing data exfiltration carried out via DNS tunneling as one such case where a known benign resource record is determined based on a DNS request without sending the DNS request to its destination. Determination of known benign resource records without forwarding DNS requests to their destinations can be performed based on detection of a variety of security risks and is not limited to detection of DNS tunneling.

FIG. 2 depicts an example where a DNS request is blocked based on a determination that it is malicious. Implementations can also analyze DNS responses for indicators of maliciousness and, if a DNS response is determined to be malicious, a known benign resource record can be determined and returned similar as in the case of FIG. 1. Examples of other indicators of maliciousness include indicators of DNS hijacking, bitflip errors, DNS misconfiguration, DNS censorship, and DNS tunneling for data infiltration. Whether or not the service 101 returns an actual DNS response or a DNS response with a known benign resource record selected as described above can be based on a confidence in a malicious verdict generated for a DNS response. For instance, the service 101 can set a confidence threshold for malicious verdicts. If a malicious verdict is sufficiently confident (i.e., associated with a confidence value or rating that exceeds the threshold), the service 101 blocks the actual DNS response and returns a DNS response with a known benign resource record as described above. If the malicious verdict is not sufficiently confident, the service 101 can return the actual DNS response. The confidence threshold can be a preconfigured setting of the service 101 determined based on prior experimentation and/or expert knowledge or may be tunable depending on an end user's security preferences.

Using DNS response analyzers/malicious DNS response detectors is an alternative configuration to attempting to return known benign rrdata for all unknown records (as explained in reference FIG. 1). DNS responses that are detected to be malicious can include those indicative of DNS hijacking, DNS misconfiguration, typosquatting, etc. Modifying all unknown resource records with known benign data according to the technique described above provides elevated security; however, this may cause service interruptions, for example, if a known benign resource record cannot be identified for a DNS response. As an alternative solution, detectors for malicious DNS responses can be employed, and DNS responses may be modified according to the described techniques in case of a confident detection that the DNS response is malicious. A detection can be defined as "confident" numerically or qualitatively, such as in terms of satisfying a numerical confidence threshold (e.g., a 0.8 confidence value associated with a malicious verdict) or by exhibiting a qualitative measure of confidence that is sufficient (e.g., very confident, confident, slightly confident, etc.). The service 101 may be configurable for either of these approaches, such as according to customer preferences. The tunability of the service 101 represents a tradeoff between the level of security provided and the amount of potential service interruptions. To illustrate, with reference to FIG. 1, the service 101 can proceed with modifying the DNS response 125 to generate the DNS response 127 if the DNS response 125 is determined to be likely malicious (e.g., by a DNS response analyzer that executes as part of the firewall 105) with a confidence that satisfies a confidence criterion.

Figure 3:
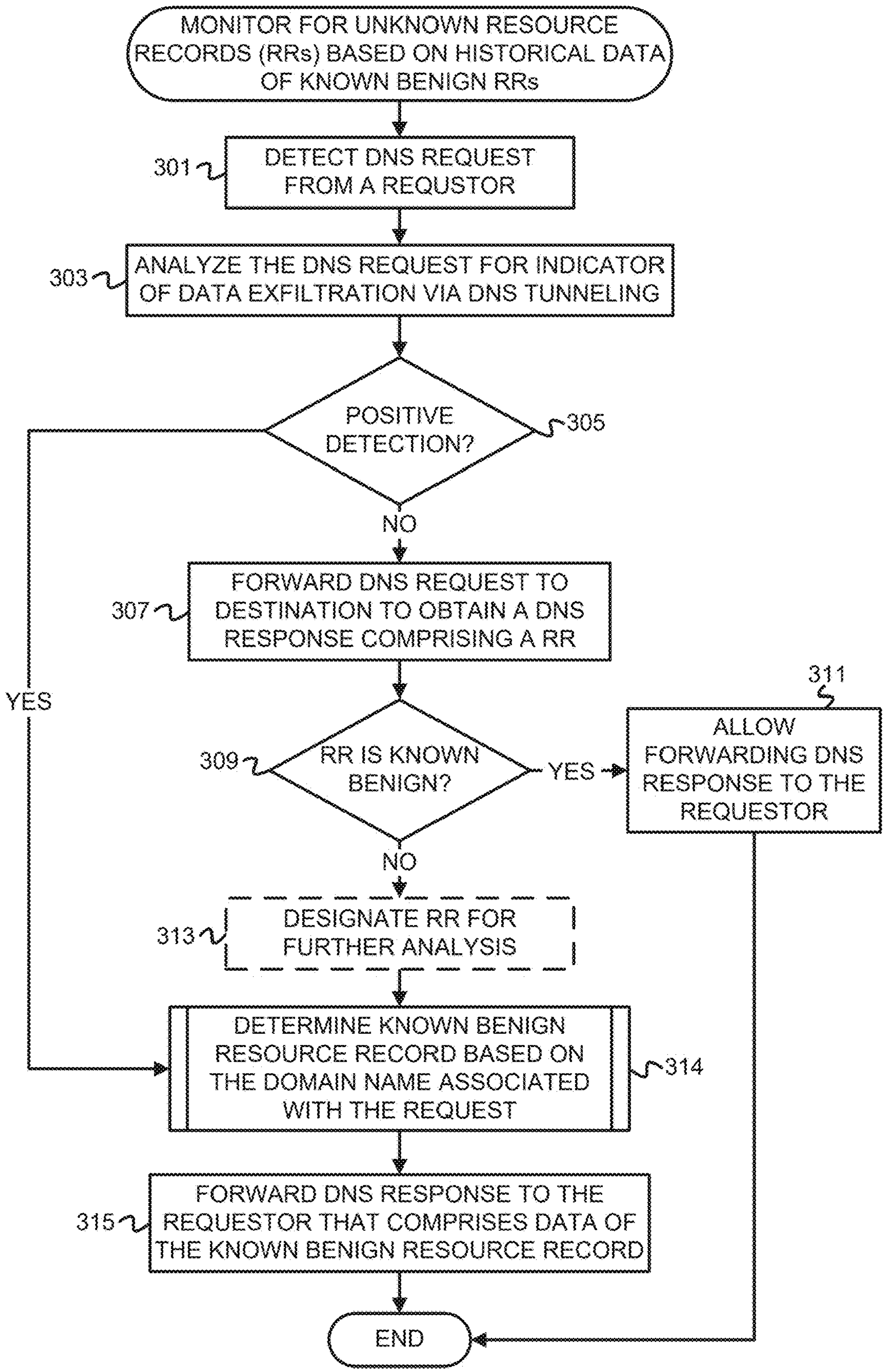
FIG. 3 is a flowchart of example operations for monitoring for unknown resource records based on historical data of known benign resource records.
Figure 4:
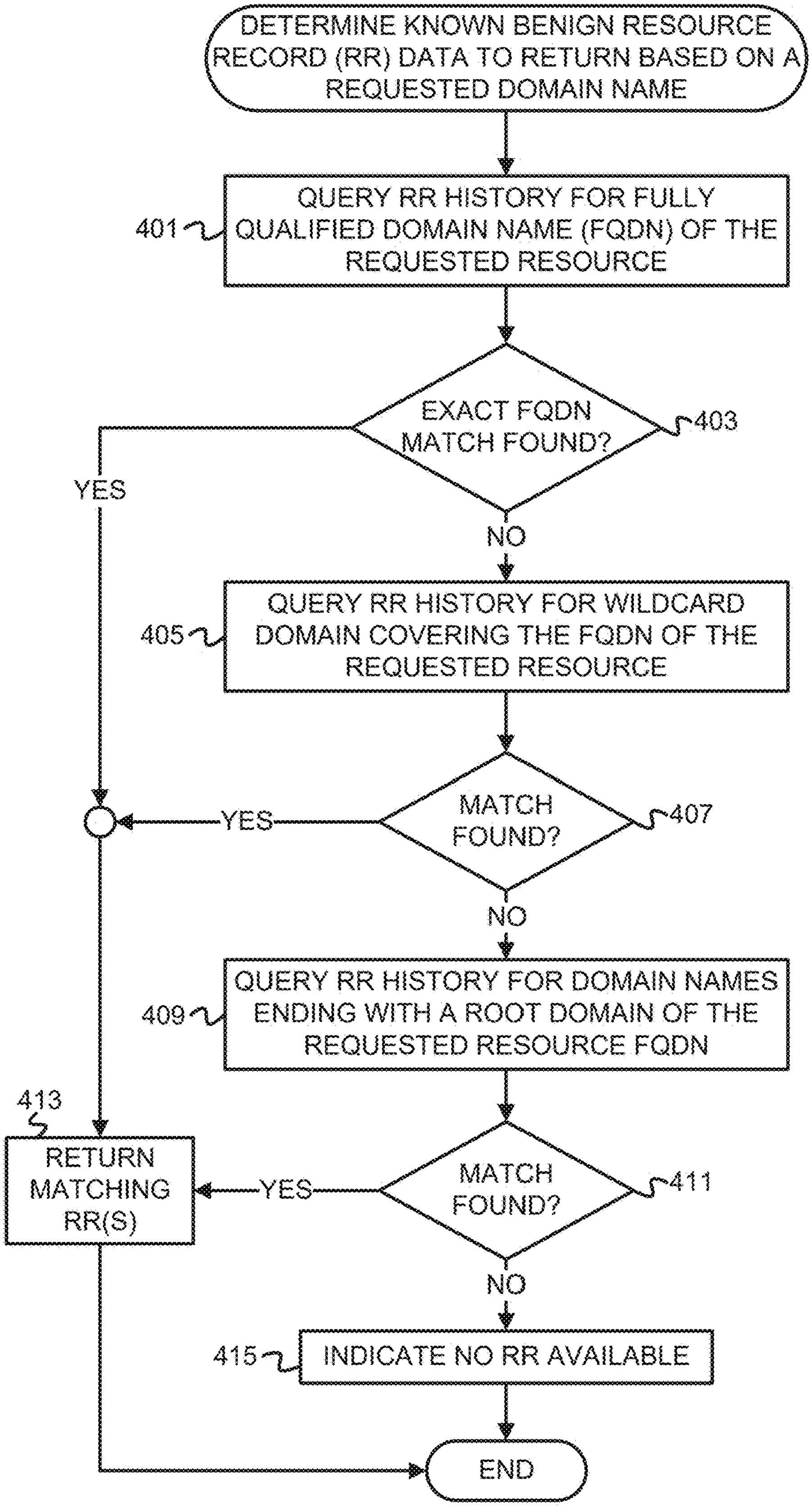
FIG. 4 is a flowchart of example operations for determining known benign resource record data to return based on a requested domain name and resource record type.
Figure 5:
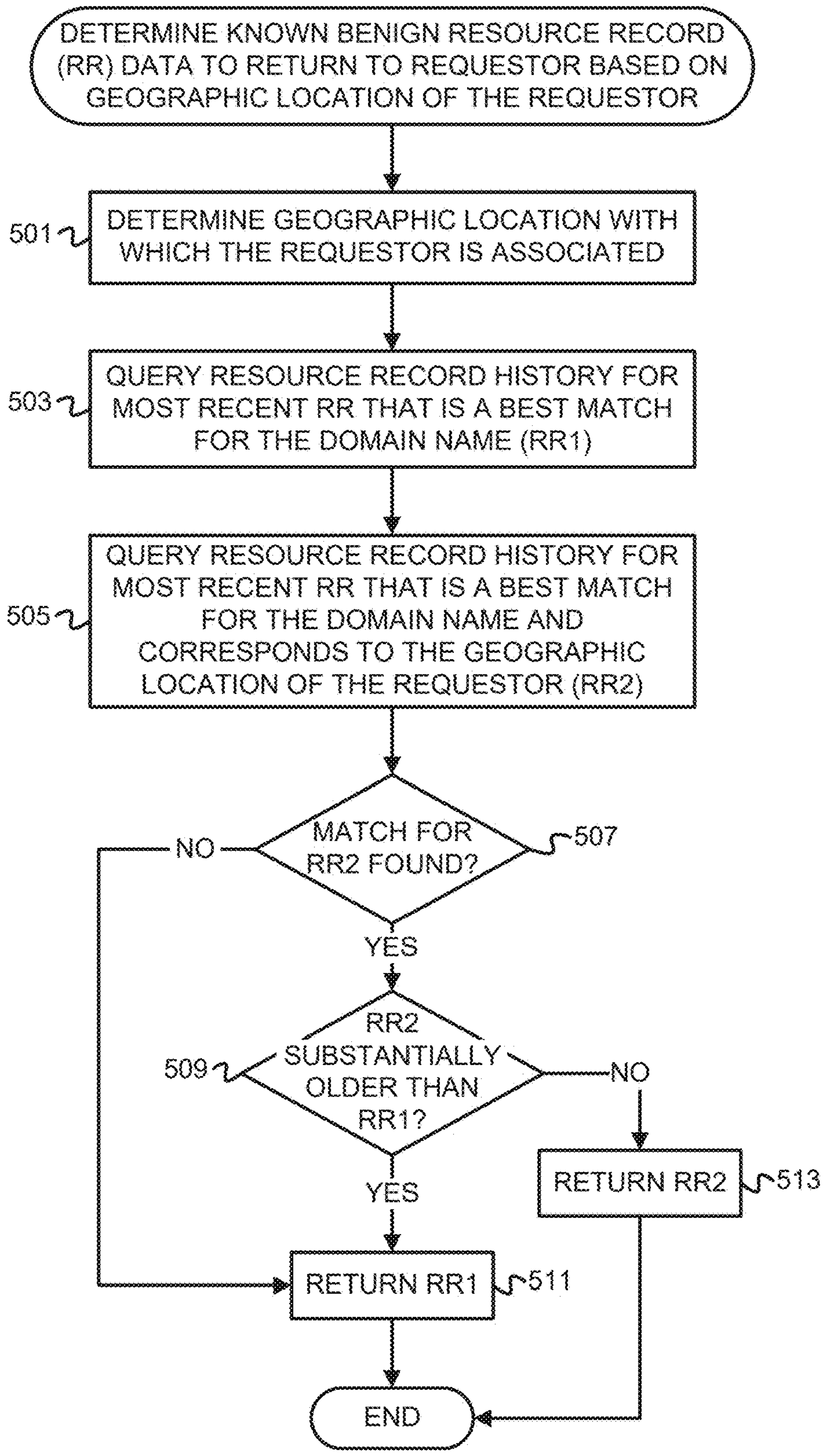
FIG. 5 is a flowchart of example operations for determining known benign resource record data to return to a requestor based on a geographic location of the requestor.

FIGS. 3-5 are flowcharts of example operations. The example operations are described with reference to a DNS communications monitoring service (hereinafter "the service") for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for monitoring for unknown resource records based on historical data of known benign resource records. The example operations assume that the service communicates with or executes as part of a cybersecurity appliance that can intercept DNS requests and responses, such as a firewall. To illustrate, the service can execute as a firewall service or as a cloud-based service that communicates with a cybersecurity appliance via a secure connection established therebetween. The example operations also refer to the cybersecurity appliance.

At block 301, the service detects a DNS request from a requestor. The DNS request indicates a domain name associated with a requested resource.

At block 303, the service analyzes the DNS request for an indicator(s) of data exfiltration via DNS tunneling ("DNS tunneling exfiltration"). Techniques for detecting DNS tunneling exfiltration are known in the art and can be employed by the service.

At block 305, the service determines if the detection of DNS tunneling exfiltration for the DNS request was positive. Whether the DNS request is indicative of DNS tunneling exfiltration can be based on the verdict resulting from analyzing the DNS request or can be based on the verdict and an associated confidence value. In the case of the latter, the service may determine that the DNS request is indicative of DNS tunneling exfiltration if the confidence value exceeds a set threshold. If the request is not indicative of DNS tunneling exfiltration, operations continue at block 307. If the request is indicative of DNS tunneling exfiltration, operations continue at block 314.

At block 307, the service allows forwarding of the DNS request to its destination to obtain a response that comprises a resource record. The cybersecurity appliance on which the service executes or with which the service communicates obtains a DNS response to fulfill the DNS request.

At block 309, the service determines if the resource record is known benign. The service performs a lookup in a data store with a hash value determined based on the resource record, where the data store maintains hash values computed based on resource records known to be benign. To determine the hash value, the service computes an intermediate value based on the rrdata of the resource record and computes a hash value based on the intermediate value. Determining intermediate values and hashing the intermediate values reduces space in the data store that is consumed by resource records by using smaller representations thereof and storing fewer hashes overall (e.g., for resource records that have a same representative hash value), which allows more resource records to be represented in the data store. Determination of the intermediate value is dependent on the resource record type. Examples of intermediate values that can be determined based on rrdata of a resource record include a subnet of an IP address indicated in the rrdata (e.g., for A and AAAA records), a root domain of the FQDN indicated in the rrdata (e.g., for MX, NS, and CNAME records), and a hash of the rrdata (e.g., for other resource record types). The service can concatenate the resulting intermediate value with the root domain for the FQDN indicated in the resource record and hash the concatenated value to generate the hash value with which the data store is queried. If the lookup in the data store results in a success (i.e., a matching hash value is identified in the data store), the service determines that the resource record is known to be benign. If the lookup fails, the resource record determines that the resource record is unknown. In some examples, the service can alternatively or additionally analyze the DNS response for indicators of maliciousness (e.g., typosquatting, DNS hijacking, DNS tunneling, DNS censorship, and/or DNS misconfiguration) to inform whether the resource record included therein is known benign. Whether the DNS response is malicious and the resource record is thus not known benign can be based on the verdict resulting from analyzing the DNS response or can be based on the verdict and an associated confidence value. As with analysis of DNS requests, in the case of the latter, the service may determine that the DNS response is malicious if the confidence value exceeds a set threshold. If the resource record is known benign, operations continue at block 311. If the resource record is not known benign, operations continue at block 313.

At block 311, the service allows forwarding of the DNS response comprising the originally obtained resource record to the requestor. The service indicates to the cybersecurity appliance that the DNS response should be allowed to be forwarded to the requestor.

At block 313, the service designates the resource record for further analysis. The service can generate a notification or report, store the resource record in a database, etc. to indicate that the resource record should be further analyzed since it is unknown. If the resource record is later determined to be known benign, it will be reflected in the data store of known benign resource records, thus allowing the service to forward DNS responses that indicate the resource record to the requestor. Block 313 is depicted with dashed lines to indicate that this operation can be performed optionally (e.g., can be a configurable setting of the service).

At block 314, the service determines a known benign resource record based on the domain name associated with the DNS request. The domain name associated with the DNS request can be identified from the DNS request in the event that a DNS response was not obtained (i.e., if operations proceeded to block 314 from block 305) or can be identified from the unknown resource record if a resource record was obtained in a DNS response. The service determines a known benign resource record that is best based on the domain name by performing one or more lookups in historical resource record data corresponding to known benign resource records. If multiple known benign resource records are identified based on a successful lookup in the historical resource record data, the service can select the resource record having the most recent timestamp and/or the resource record associated with a geographical location with which the requestor is located (e.g., based on country codes associated with resource records indicated in the historical resource record data). Determining a known benign resource record to return is described in further detail in reference to FIG. 4.

At block 315, the service forwards the DNS response to the requestor that comprises the data of the known benign resource record. The service incorporates data extracted from the known benign resource record (i.e., the rrdata) in a DNS response that is communicated to the requestor, thus creating a new resource record that is included in the DNS response returned to the requestor. The service can generate a new DNS response if a DNS response was not obtained for the DNS request (e.g., if the DNS request was determined to be malicious) or, if a DNS response was obtained, can replace the rrdata field (or optionally other fields) of the resource record indicated in the original DNS response with the corresponding rrdata of the known benign resource record before forwarding the DNS response to the requestor.

The example operations of FIG. 3 assume that a known benign resource record is identified as a result of the lookup(s) performed at block 314. In implementations, lookups may be unsuccessful in that none of the lookups performed for the domain name in historical resource record data yield a hit. In this case, the service can indicate that the request cannot be fulfilled, which the cybersecurity appliance indicates in the DNS response that is generated and communicated to the requestor. In other examples, the DNS response can simply be blocked.

FIG. 4 is a flowchart of example operations for determining known benign resource record data to return based on a requested domain name and rrtype. The example operations assume that the service has detected a DNS request or a DNS response that is malicious or unknown. Whether the example operations are performed based on detection of a DNS request or a DNS response is dependent on whether the DNS request was determined to be malicious as described above in reference to FIG. 3.

At block 401, the service queries a resource record history for the FQDN of the requested resource. The service maintains or has access to a resource record history of known benign resource records. The service identifies the FQDN from the resource record (if processing a DNS response) or from the DNS request (if processing a DNS request).

At block 403, the service determines if an exact FQDN match was found in the resource record history. If there is not a resource record exactly matching the FQDN, operations continue at block 405. If an exact match was found for a resource record comprising the FQDN, operations continue at block 413.

At block 405, the service queries the resource record history for a wildcard domain covering the FQDN of the requested resource. The wildcard domain can be a wildcard that matches subdomains of the root domain of the FQDN. For instance, for the FQDN "ldjc4.example.com", the service queries the resource record history for the wildcard domain "*.example.com".

At block 407, the service determines if a match was found in the resource record history. If a match was not found, operations continue at block 409. If a match was found, operations continue at block 413.

At block 409, the service queries the resource record history for domain names ending with a root domain of the requested resource's FQDN's root domain. For instance, for the FQDN "ldjc4.example.com", the service queries the resource record history for records where the FQDN has the root domain "example.com".

At block 411, the service determines if a match was found in the resource record history. If a match was found, operations continue at block 413. If a match was not found, operations continue at block 415.

At block 413, the service returns the matching resource record(s). The service returns one or more records that matched the domain name indicated in the query of the resource record history. In implementations, the service may return the most recent record of those that matched, or the record with the most recent timestamp.

At block 415, the service indicates that there is not a resource record available. The service generates a notification, alert, etc. that there is not a known benign resource record that is sufficient to return to the requestor. In other examples, the service may indicate that there is not a resource record available by not returning anything.

FIG. 5 is a flowchart of example operations for determining known benign resource record data to return to a requestor based on a geographic location of the requestor. Country codes or other indicators of geographic location can be used to supplement the lookups described in reference to FIG. 4. For instance, each lookup can indicate a domain name, which can be a FQDN, wildcard domain, etc., and a country code or other identifier indicating a geographical location with which the requestor is associated. Accordingly, each resource record represented in the resource record history is associated with one or more indicators of geographic locations for which the resource record has been obtained. Geographical locations also are not limited to countries and can be defined at a broader regional level (e.g., regions encompassing multiple countries). The example operations assume that a DNS request or DNS response has been received and the service has identified a domain name of a requested resource. The example operations also refer to the resource record history described in reference to FIG. 4.

At block 501, the service determines a geographic location with which the requestor is associated. For example, the service can determine the geographic location based on an IP address associated with the requestor or a geolocation of the firewall.

At block 503, the service queries the resource record history for a most recent resource record that is a best match for the domain name. The obtained resource record is subsequently referred to as "RR1." The domain name used to query the resource record history can be any representation of a domain name described in reference to FIG. 4. In other words, the domain name can be a FQDN of the requested resource, a wildcard domain, or a domain name that includes the root domain of the FQDN. Which domain name representation is used to query the resource record history can also be based on whether an initial lookup(s) in the resource record history was successful as similarly described in reference to FIG. 4. For brevity, subsequent operations assume that the lookup for RR1 was successful.

At block 505, the service queries the resource record history for a most recent resource record that is a best match for the domain name and corresponds to the geographic location of the requestor. Like with the domain name of block 503, the domain name used to query the resource record history can be any representation of a domain name described in reference to FIG. 4 and can be dependent on whether an initial lookup(s) was successful. The service also includes an indication of the geographic location of the requestor in the query to the resource record history. The indication of the geographic location may be a country code, for instance. Indications of geographic locations have been previously determined and configured on the service. The obtained resource record, if any, is subsequently referred to as "RR2."

At block 507, the service determines if a match for RR2 is found. If a match was found and RR2 was returned as a result of querying the resource record history, operations continue at block 509. Otherwise, operations continue at block 511, wherein the service returns the resource record RR1.

At block 509, the service determines if RR2 is substantially older than RR1. To prioritize geographically relevant resource records without sacrificing recency, the service determines if RR2 is recent enough to return as the best match or if it is too old relative to RR1. The service can determine a difference between timestamps of RR1 and RR2 and evaluate the difference based on a threshold, where RR2 is determined to be substantially older than RR1 if the difference between timestamps exceeds the threshold. If RR2 is substantially older than RR1, operations continue at block 511, where the service returns the resource record RR1. Otherwise, if RR2 is not substantially older than RR1 and thus is sufficiently recent or up-to-date, operations continue at block 513, where the service returns the resource record RR2. Data of the returned resource record, whether RR1 or RR2 was returned, can thus be incorporated in a DNS response that is returned to the requestor as described above.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the example operations of FIG. 3 can be performed in parallel or concurrently as multiple DNS requests and/or DNS responses are detected across sessions. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
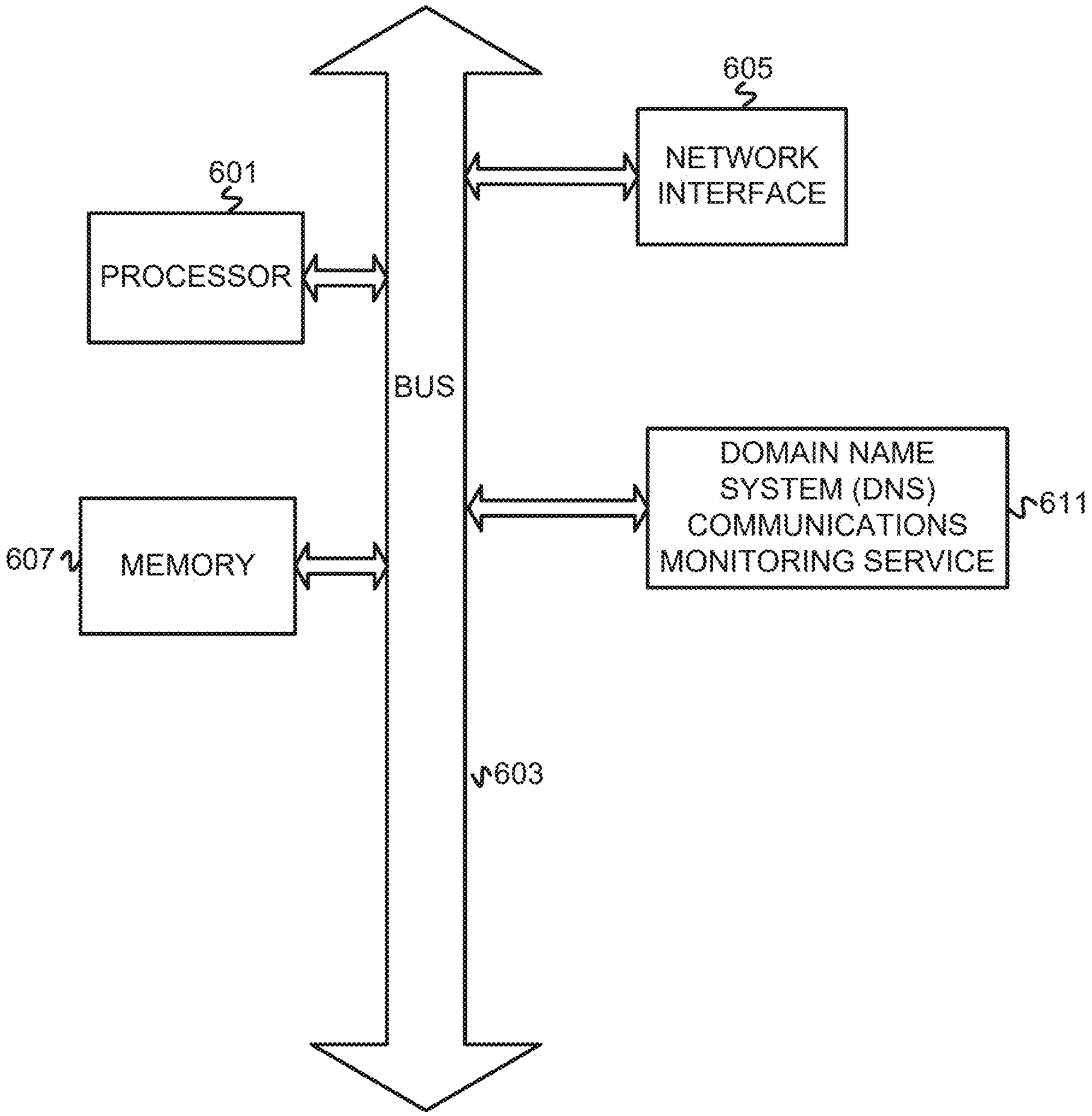
FIG. 6 depicts an example computer system with a DNS communications monitoring service.

FIG. 6 depicts an example computer system with a DNS communications monitoring service. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes DNS communications monitoring service 611. The DNS communications monitoring service 611 determines if resource records identified in DNS responses are known to be benign. For resource records that are determined to be unknown, the DNS communications monitoring service 611 determines a best resource record known to be benign to return based at least partly on the domain name identified in the unknown resource record. The DNS communications monitoring service 611 also determines best known benign resource records to return in DNS responses constructed and communicated to clients in cases where DNS requests are blocked and DNS responses thus are not retrieved (e.g., if DNS tunneling is detected based on a DNS request). Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

based on detecting a Domain Name System (DNS) request from a requestor, determining if the DNS request is permitted, wherein the DNS request indicates a first domain name;

based on determining that the DNS request is permitted, forwarding the DNS request to a corresponding destination to obtain a first DNS response, wherein the first DNS response comprises a first resource record;

determining that the first resource record is unknown or malicious;

determining data of a known resource record to return based, at least in part, on querying historical resource record data for the first domain name, wherein the known resource record is known to be benign; and forwarding a second DNS response comprising the data of the known resource record to the requestor.

2. The method of claim 1, further comprising, based on determining that the DNS request is not permitted, determining the data of the known resource record and forwarding the second DNS response to the requestor without forwarding the DNS request toward the corresponding destination, wherein determining that the DNS request is not permitted comprises analyzing the DNS request for one or more indicators of maliciousness and determining based on the analyzing that the DNS request is likely malicious.

3. The method of claim 1, wherein determining that the first resource record is unknown comprises, querying a first data store with a first value determined based on the first resource record, wherein the first data store maintains values determined from known resource records; and determining based on a result of querying the first data store that the first resource record is unknown.

4. The method of claim 3, further comprising determining the first value based on the first resource record, wherein determining the first value comprises applying a function to at least a subset of data included in the first resource record to compute a second value and hashing the second value concatenated with a root domain of a domain name indicated in the first resource record to generate the first value, wherein the function is determined based on a type of the first resource record.

5. The method of claim 1, wherein determining the known resource record comprises, based on obtaining a result of querying the historical resource record data that indicates a second resource record comprising a name that is an exact match to the first domain name, using the second resource record as the known resource record.

6. The method of claim 5, further comprising, based on determining from the result that there is not an exact match for the first domain name in the historical resource record data, querying the historical resource record data for a wildcard domain covering the first domain name; and based on obtaining a result of querying the historical resource record data that indicates a third resource record comprising the wildcard domain, using the third resource record as the known resource record.

7. The method of claim 6, further comprising, based on determining from a result of querying the historical resource record data for the wildcard domain that there is not a match for the wildcard domain in the historical resource record data, querying the historical resource record data for domain names that ends with a root domain of the first domain name; and based on obtaining a result of querying the historical resource record data that indicates a fourth resource record comprising a name that ends with the root domain, using the fourth resource record as the known resource record.

8. The method of claim 1, further comprising determining a country in which the requestor is located, wherein querying the historical resource record data for the first domain name comprises querying the historical resource record data for the first domain name and a country code corresponding to the country.

9. The method of claim 1, wherein determining that the first resource record included in the first DNS response is unknown or malicious comprises analyzing the first DNS response for one or more indicators of maliciousness and determining that the DNS response is malicious based on results of analyzing the first DNS response.

10. The method of claim 1, further comprising, based on determining that the first resource record is known benign, forwarding the first DNS response with the first resource record to the requestor.

11. One or more non-transitory machine-readable media having program code stored thereon, the program code comprising instructions to:

based on detection of a Domain Name System (DNS) request from a client, determine whether to forward the DNS request to a corresponding destination, wherein the DNS request indicates a first domain name;

based on a determination to forward the DNS request to the corresponding destination, forward the DNS request to the corresponding destination to obtain a first DNS response, wherein the first DNS response comprises a first resource record;

determine that the first resource record is not known to be benign;

determine data of a second resource record to return based, at least in part, on querying historical resource record data for the first domain name, wherein the second resource record is known to be benign; and forward a second DNS response comprising the data of the second resource record to the client.

12. The non-transitory machine-readable media of claim 11, wherein the program code further comprises instructions to, based on a determination not to forward the DNS request to the corresponding destination, determine the second resource record and forward the second DNS response to the client without forwarding the DNS request to the corresponding destination.

13. The non-transitory machine-readable media of claim 11, wherein the instructions to determine that the first resource record is not known to be benign comprise instructions to, query a first data store with a first value determined based on the first resource record, wherein the first data store maintains values determined from resource records known to be benign; and determine based on a result of querying the first data store that the first resource record is unknown.

14. The non-transitory machine-readable media of claim 11, wherein the instructions to determine the second resource record comprise instructions to query the historical resource record data for at least one of an exact match of the first domain name, a wildcard domain covering the first domain name, and a domain name that ends with a root domain of the first domain name.

15. An apparatus comprising:

a processor; and a non-transitory machine-readable medium having instructions stored thereon that are executable by the processor to cause the apparatus to, based on detection of a Domain Name System (DNS) request indicating a first domain name from a client, determine if the DNS request is permitted;

based on a determination that the DNS request is permitted, forward the DNS request to a corresponding destination to obtain a first DNS response that comprises a first resource record;

determine that the first resource record is not known to be benign;

determine data of a second resource record that is known to be benign based, at least in part, on querying historical resource record data for the first domain name; and forward a second DNS response comprising the data of the second resource record to the client.

16. The apparatus of claim 15, further comprising instructions executable by the processor to cause the apparatus to, based on a determination that the DNS request is not permitted, determine the second resource record and forward the second DNS response to the client without forwarding the DNS request to a destination indicated in the DNS request.

17. The apparatus of claim 15, wherein the instructions executable by the processor to cause the apparatus to determine that the first resource record is not known to be benign comprise instructions executable by the processor to cause the apparatus to, query a first data store with a first value determined based on the first resource record, wherein the first data store maintains values determined from resource records known to be benign; and determine based on a result of querying the first data store that the first resource record is unknown.

18. The apparatus of claim 17, further comprising instructions executable by the processor to cause the apparatus to determine the first value based on the first resource record, wherein the instructions executable by the processor to cause the apparatus to determine the first value comprise instructions executable by the processor to cause the apparatus to apply a function to at least a subset of data included in the first resource record to compute a second value and hash the second value concatenated to a root domain of a domain name indicated in the first resource record to generate the first value, wherein the function is determined based on a type of the first resource record.

19. The apparatus of claim 15, wherein the instructions executable by the processor to cause the apparatus to determine the second resource record comprise instructions executable by the processor to cause the apparatus to query the historical resource record data for at least one of an exact match of the first domain name, a wildcard domain covering the first domain name, and a domain name that ends with a root domain of the first domain name.

20. The apparatus of claim 15, further comprising instructions executable by the processor to cause the apparatus to determine a country in which the client is located, wherein the instructions executable by the processor to cause the apparatus to query the historical resource record data for the first domain name comprise instructions executable by the processor to cause the apparatus to query the historical resource record data for the first domain name and an indication of the country.

* * * * *